Patented June 28, 1938

2,122,137

UNITED STATES PATENT OFFICE 2,122,137

ALKYLOXY AND ARYLOXY PHTHALOCY-ANINES

Sebastian Gassner and Berthold Bienert, Leverkusen-I. G. Werk, Rhine, Germany, assignors to General Aniline Works, Inc., New York, N. Y., a corporation of Delaware No Drawing. Application January 30, 1937, Serial No. 123,145. In Germany January 30, 1936

6 Claims. (Cl. 260—12)

The present invention relates to alkyloxy and aryloxy phthalocyanines.

Phthalocyanines represent a new class of pigment dyestuffs which can be prepared in various ways, f. i., by heating an ortho-dihalogen-benzene or an ortho-halogen-nitrile of the benzene series with cuprous cyanide or by heating o-dinitriles of the benzene series with copper or copper salts. The compounds which are obtainable according to the said processes are characterized by their containing copper in chemical combination. In a similar manner phthalocyanines containing other polyvalent metals than copper can be prepared. Also metalfree phthalocyanines have been prepared either by removing from the phthalocyanines those metals which are relatively loosely bound, such as magnesium, or by heating ortho-dinitriles of the benzene series with an alkali metal alcoholate followed by a hydrolysis of the alkali metal compound thus formed. Phthalocyanines which are derived from ortho-dihalogenbenzenes, ortho-halogennitriles of the benzene series or ortho-dinitriles of the benzene series are for brevity's sake in the following designated as "phthalocyanines of the benzene series".

Most of the hitherto known phthalocyanines show clear blue shades and part of them are characterized by their excellent fastness properties. As far as within the phthalocyanine series products of green coloration have been obtained, they are relatively dull in shades or show insufficient fastness properties.

It is the object of the present invention to prepare phthalocyanines which combine a clear greenish shade with the fastness properties of, for instance, a copper phthalocyanine of the benzene series. Other objects of the present invention will be apparent from the description and claims:

We have found that the presence of alkoxy or aryloxy groups in the benzene nuclei effects that the shades turn from blue to greenish-blue or green. In accordance therewith our invention is concerned with phthalocyanines of the benzene series containing alkoxy and/or aryloxy groups in the benzene nuclei. All compounds of the character described are within the scope of this invention, regardless as to whether they have been prepared by a process starting from ortho-dihalogenbenzenes or from ortho-dinitriles of the benzene series wherein the benzene nuclei contain alkoxy and/or aryloxy groups, or whether these compounds have been prepared in any other way. It is to be understood that diether groups of the type described in Example 4 are intended to fall within the scope of the term "aryloxy groups." As to the various methods of prepared phthalocyanines from ortho-dinitriles or other starting materials reference is made to what is stated above with respect to the prior art. We, therefore, confine ourselves to state that copper salts or free copper are preferred reagents for preparing phthalocyanines and that the reaction may be performed in the presence of solid diluents such as sodium sulfate or of liquid diluents such as pyridine, quinoline, benzophenone, nitrobenzene or ortho-dichlorobenzene.

The new phthalocyanines which are obtainable in accordance with this invention generally show clear green to greenish-blue shades. Therefore, and in view of their excellent fastness properties they represent valuable pigment dyestuffs and can be employed, for instance, for graphic wall-paper printing and for coloring artificial silk. When compared with the corresponding unsubstituted compounds our new products are distinguished by their being slightly more soluble in organic solvents. Thus, the sodium containing tetraethoxy dyestuff is soluble in hot amylalcohol, and the corresponding metalfree compound is somewhat soluble in toluene. Of particular importance are the copper phthalocyanines and among the latter the tetraethoxy compound, though the metalfree products and those compounds containing in complex combination other metals such as cobalt, nickel, zinc or iron are not excluded from our invention. Our new phthalocyanines may contain various other substituents without departing from the scope of this invention. Thus, they may be substituted by halogen atoms, which can either be introduced into the starting materials or into the ready-made phthalocyanines.

Prior to use our new phthalocyanines are preferably pasted by dissolving the same in cold sulfuric acid or in ethyl sulfuric acid with subsequent precipitation in water; sulfuric acid monohydrate is preferred in case of compounds which, owing to the presence of substituents, are not capable of being sulfurized; ethyl sulfuric acid is preferred in case of aryloxy groups. In this manner, the phthalocyanines are converted into a finely dispersed state.

Among the substitution products of our new phthalocyanines particular importance is attached to the sulfonic acid which can easily be obtained, for instance, from the aryloxy compounds. These sulfonic acids are soluble in water and can be converted into new pigment dyestuffs by treating the same with salts of polyvalent metals or with lake forming amines.

The following examples illustrate the invention without, however, restricting it thereto the parts being by weight:—

Example 1

Into a solution of 0.4 part of sodium in 28 parts of amyl alcohol there are added at 60–70° C. 6 parts of 4-ethoxyhethalonitrile (F. P. 129–132° C.) which is prepared by subliming the sodium salt of 5-ethoxy-2-cyanobenzene-1-sulfonic acid with potassium ferrocyanide in vacuo. Thereupon the whole reaction mixture is heated to boiling for 2 hours. On cooling great bluish-green needles are crystallizing from the intensively green colored reaction mixture which are sucked off, rinsed with amyl alcohol and ethyl alcohol and then dried. The dyestuff thus obtained is soluble in concentrated sulfuric acid with a violet coloration. When pouring the solution into water the dyestuff separates in green flakes which represent the metalfree tetraethoxyphthalocyanine.

Example 2

1 part of 4-methoxyphthalonitrile is intimately mixed with 1 part of cuprous chloride and 5 parts of sodium sulfate and heated for about half an hour to 180–185° C. The product thus obtained is disintegrated and boiled with water and hydrochloric acid. A bronze colored powder is thus obtained in a good yield which after redissolving in sulfuric acid and pouring into water precipitates in green flakes.

A dyestuff of similar properties is obtained when replacing the 4-methoxyphthalonitrile by the 4-ethoxyphthalonitrile.

Example 3

The crude reaction product which is obtained by heating the sodium salt of phenoxycyanobenzene sulfonic acid of the following formula:

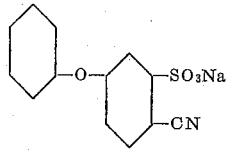

with potassium ferrocyanide in vacuo is heated for a prolonged time at higher temperatures with half the amount of cuprous chloride, if desired, with the addition of several times its amount of sodium sulfate. On cooling the reaction product is boiled with alcohol and hydrochloric acid; the residue obtained thereby represents a clear bluish-green product which is soluble in sulfuric acid with a violet coloration, sulfonation occurring thereby. The sulfonic acid of the new product can be converted into metal lakes representing valuable pigment dyestuffs.

Example 4

2.8 parts of 2,3-dicyanodiphenylene dioxide of the formula:

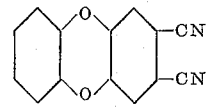

which is prepared by subliming the sodium salt of 2-cyanodiphenylene dioxide-3-sulfonic acid with potassium ferrocyanide in vacuo, are heated for about 2 hours to 180° C. together with 0.75 part of cuprous chloride in the presence of 17 parts of benzophenone and 0.28 part of pyridine. On working up in the usual manner the copper containing product is somewhat more dull and its shade has somewhat more turned to olive when compared with the above described products.

Example 5

10 parts of 4-ethoxyphthalonitrile and 10 parts of anhydrous cobalt chloride are heated in 30 parts of quinoline for about 1 hour to 180° C. On pouring the reaction mixture into excess dilute hydrochloric acid the separating dyestuff is sucked off, rinsed with water and alcohol and then dried. The tetraethoxy-(4)-cobaltphthalocyanine thus obtained is soluble in concentrated sulfuric acid with a brownish violet coloration. When pouring the sulfuric acid solution into water it separates in greenish-blue flakes.

Example 6

When replacing in Example 5 the anhydrous cobalt chloride by anhydrous nickelchloride the tetraethoxy-nickel-phthalocyanine is obtained which is soluble in concentrated sulfuric acid with a violet coloration and represents a bluish-green pigment dyestuff.

We claim:—

1. A phthalocyanine of the benzene series being substituted in the benzene nuclei by substituents selected from the group consisting of alkyloxy and aryloxy groups.

2. A copper phthalocyanine of the benzene series being substituted in the benzene nuceli by substituents selected from the group consisting of alkyloxy and aryloxy groups.

3. A metal-free phthalocyanine of the benzene series being substituted in the benzene nuclei by substituents selected from the group consisting of alkyloxy and aryloxy groups.

4. A phthalocyanine as claimed in claim 1 wherein the substituents are ethoxy groups.

5. A copper phthalocyanine as claimed in claim 2 wherein the substituents are ethoxy groups.

6. A metal-free phthalocyanine as claimed in claim 3 wherein the substituents are ethoxy groups.

SEBASTIAN GASSNER.
BERTHOLD BIENERT.